(12) United States Patent
Duffy et al.

(10) Patent No.: US 8,459,466 B2
(45) Date of Patent: Jun. 11, 2013

(54) SYSTEMS AND METHODS FOR OPTIMIZING A SINGLE-STREAM MATERIALS RECOVERY FACILITY

(75) Inventors: Sean P. Duffy, Charlotte, NC (US); S. Graham Stevens, Charlotte, NC (US)

(73) Assignee: Re Community Energy, LLC, Rutland, VT (US)

( * ) Notice: Subject to any disclaimer, the term of this patent is extended or adjusted under 35 U.S.C. 154(b) by 841 days.

(21) Appl. No.: 11/802,497

(22) Filed: May 23, 2007

(65) Prior Publication Data

US 2008/0290006 A1   Nov. 27, 2008

(51) Int. Cl.
*B07C 5/00*   (2006.01)

(52) U.S. Cl.
USPC .......................... 209/630; 209/592; 209/12.1

(58) Field of Classification Search
USPC ................ 209/509, 520, 671, 672, 930, 12.1, 209/512, 592, 629, 630
See application file for complete search history.

(56) References Cited

U.S. PATENT DOCUMENTS

| | | |
|---|---|---|
| 3,003,886 A | 10/1961 | Pither |
| 3,790,091 A | 2/1974 | Law et al. |
| 3,802,558 A | 4/1974 | Rhys |
| 3,804,249 A | 4/1974 | Gibbons et al. |
| 3,848,813 A | 11/1974 | Stanczyk et al. |
| 3,907,670 A | 9/1975 | Fernandes |
| 3,922,975 A | 12/1975 | Reese |
| 4,044,695 A | 8/1977 | Mackenzie et al. |
| 4,069,145 A | 1/1978 | Sommer, Jr. et al. |
| 4,070,273 A | 1/1978 | Morey |
| 4,072,273 A | 2/1978 | Reiniger |
| 4,201,551 A | 5/1980 | Lyshkow et al. |
| 4,204,906 A | 5/1980 | Liu |
| 4,245,999 A | 1/1981 | Reiniger |
| 4,265,636 A | 5/1981 | Frankiewicz |
| 4,297,322 A | 10/1981 | Liu |
| 4,341,353 A | 7/1982 | Hamilton et al. |
| 4,353,713 A | 10/1982 | Cheng |
| 4,387,019 A | 6/1983 | Dale et al. |

(Continued)

FOREIGN PATENT DOCUMENTS

| | | |
|---|---|---|
| DE | 19953208 | 5/2000 |
| DE | 10135678 | 2/2003 |

(Continued)

OTHER PUBLICATIONS

Office Action for U.S. Appl. No. 11/883,758, mailed Apr. 12, 2011.

(Continued)

*Primary Examiner* — Joseph C Rodriguez
*Assistant Examiner* — Kalyanavenkateshware Kumar

(57) ABSTRACT

Systems and methods for sorting a plurality of recyclable items in a single-stream materials recovery facility (SSMRF) are provided. In some embodiments, a system includes an infeed conveying system, a fiber transfer conveyor, a container transfer conveyor, and a glass sorting and conveying system. The system further includes a controller configured to obtain total weight and volume of recyclable items at the infeed conveying system. The controller estimates a percent weight of fiber items and a percent weight of non-fiber items relative to the total weight. Based on the estimates, the controller controls speed of at least one of the infeed conveying system, the fiber transfer conveyor, the container transfer conveyor, and the glass sorting and conveying system.

26 Claims, 6 Drawing Sheets

U.S. PATENT DOCUMENTS

| | | |
|---|---|---|
| 4,399,029 A | 8/1983 | Clin et al. |
| 4,457,772 A | 7/1984 | Haynes et al. |
| 4,533,053 A | 8/1985 | Kenny et al. |
| 4,553,977 A | 11/1985 | Fry |
| 4,658,965 A * | 4/1987 | Smith ................... 209/672 |
| 4,678,860 A | 7/1987 | Kuester |
| 4,778,116 A | 10/1988 | Mayberry |
| 4,832,204 A | 5/1989 | Handy et al. |
| 4,844,351 A | 7/1989 | Holloway |
| 4,874,134 A | 10/1989 | Wiens |
| 5,009,370 A | 4/1991 | Mackenzie |
| 5,014,996 A | 5/1991 | von Braunhut |
| 5,048,694 A | 9/1991 | Iwamoto et al. |
| 5,071,075 A | 12/1991 | Wiens |
| 5,091,077 A | 2/1992 | Williams |
| 5,104,047 A | 4/1992 | Simmons |
| 5,104,419 A | 4/1992 | Funk |
| 5,150,307 A | 9/1992 | McCourt et al. |
| 5,184,780 A | 2/1993 | Wiens |
| 5,234,109 A | 8/1993 | Pederson |
| 5,250,100 A | 10/1993 | Armbristor |
| 5,263,591 A | 11/1993 | Taormina et al. |
| 5,278,282 A | 1/1994 | Nauman et al. |
| 5,299,693 A | 4/1994 | Ubaldi et al. |
| 5,314,071 A | 5/1994 | Christian et al. |
| 5,333,797 A | 8/1994 | Becker et al. |
| 5,333,886 A | 8/1994 | Sanders |
| 5,344,025 A | 9/1994 | Tyler et al. |
| 5,356,082 A | 10/1994 | Prinz et al. |
| 5,366,093 A | 11/1994 | Huber |
| 5,370,234 A | 12/1994 | Sommer, Jr. et al. |
| 5,419,438 A | 5/1995 | Squyres et al. |
| 5,443,157 A | 8/1995 | Baker et al. |
| 5,461,136 A | 10/1995 | Krutak et al. |
| 5,464,100 A | 11/1995 | Oka et al. |
| 5,465,847 A | 11/1995 | Gilmore |
| 5,470,918 A | 11/1995 | Tsutumi et al. |
| 5,485,925 A | 1/1996 | Miller et al. |
| 5,503,788 A | 4/1996 | Lazareck et al. |
| 5,541,831 A | 7/1996 | Thomas |
| 5,547,134 A | 8/1996 | Rubenstein et al. |
| 5,555,984 A | 9/1996 | Sommer, Jr. et al. |
| 5,588,598 A | 12/1996 | Becker et al. |
| 5,611,493 A | 3/1997 | Hayashi et al. |
| 5,638,959 A | 6/1997 | Sommer, Jr. et al. |
| 5,667,079 A | 9/1997 | Jongebloed |
| 5,675,416 A | 10/1997 | Campbell et al. |
| 5,718,737 A | 2/1998 | Mosch |
| 5,740,918 A | 4/1998 | Hayashi et al. |
| 5,794,788 A | 8/1998 | Massen et al. |
| 5,890,663 A | 4/1999 | Strach et al. |
| 5,901,856 A | 5/1999 | Brantley, Jr. et al. |
| 5,902,976 A | 5/1999 | Beasley |
| 5,922,090 A | 7/1999 | Fujimura et al. |
| 5,971,162 A | 10/1999 | Allagnat et al. |
| 5,988,395 A | 11/1999 | Calo et al. |
| 6,000,639 A | 12/1999 | Ganguli |
| 6,124,560 A | 9/2000 | Roos et al. |
| 6,144,004 A | 11/2000 | Doak |
| 6,144,044 A | 11/2000 | Yoshinaga et al. |
| 6,152,306 A | 11/2000 | Miller |
| 6,168,102 B1 | 1/2001 | Bergart et al. |
| 6,230,521 B1 | 5/2001 | Lehman |
| 6,250,472 B1 | 6/2001 | Grubbs et al. |
| 6,264,038 B1 | 7/2001 | Schmidt et al. |
| 6,351,676 B1 * | 2/2002 | Thomas ................... 700/28 |
| 6,369,882 B1 | 4/2002 | Bruner et al. |
| 6,401,936 B1 | 6/2002 | Isaacs et al. |
| 6,423,878 B2 | 7/2002 | Reverso et al. |
| 6,446,813 B1 | 9/2002 | White et al. |
| 6,464,082 B1 | 10/2002 | Kimmel et al. |
| 6,467,708 B1 | 10/2002 | Terzini et al. |
| 6,484,886 B1 | 11/2002 | Isaacs et al. |
| 6,578,783 B2 | 6/2003 | Simon et al. |
| 6,763,280 B1 | 7/2004 | Lehman |
| 6,902,065 B2 | 6/2005 | Kimura et al. |
| 6,945,484 B1 | 9/2005 | Terzini et al. |
| 6,974,097 B2 | 12/2005 | Simon et al. |
| 7,081,594 B1 | 7/2006 | Khalfan et al. |
| 7,188,730 B2 | 3/2007 | Centers et al. |
| 7,252,691 B2 | 8/2007 | Philipson et al. |
| 7,264,124 B2 | 9/2007 | Bohlig et al. |
| 7,302,407 B2 | 11/2007 | Bohlig et al. |
| 7,341,156 B2 | 3/2008 | Bohlig et al. |
| 7,351,929 B2 | 4/2008 | Afsari et al. |
| 7,355,140 B1 | 4/2008 | Afsari |
| 7,389,880 B2 | 6/2008 | Goldmann et al. |
| 7,449,655 B2 | 11/2008 | Cowling et al. |
| 7,611,018 B2 | 11/2009 | Bohlig et al. |
| 7,893,378 B2 | 2/2011 | Kenny |
| 2003/0001726 A1 | 1/2003 | Moore |
| 2003/0015461 A1 | 1/2003 | Miyamoto et al. |
| 2003/0133484 A1 | 7/2003 | Kimura et al. |
| 2004/0095571 A1 | 5/2004 | Bourely et al. |
| 2004/0133484 A1 | 7/2004 | Kreiner et al. |
| 2004/0140248 A1 | 7/2004 | Dauzvardis et al. |
| 2004/0159593 A1* | 8/2004 | Allen et al. ................... 209/606 |
| 2005/0032920 A1 | 2/2005 | Norbeck et al. |
| 2005/0035032 A1 | 2/2005 | McGee |
| 2005/0126958 A1 | 6/2005 | Bohlig et al. |
| 2006/0081513 A1* | 4/2006 | Kenny ................... 209/672 |
| 2006/0081514 A1* | 4/2006 | Kenny ................... 209/672 |
| 2006/0085212 A1 | 4/2006 | Kenny |
| 2007/0099038 A1 | 5/2007 | Galloway |
| 2007/0187299 A1 | 8/2007 | Valerio |
| 2008/0014112 A1 | 1/2008 | Lee et al. |
| 2008/0020456 A1 | 1/2008 | Choate et al. |
| 2008/0061124 A1 | 3/2008 | Langlois et al. |
| 2008/0061125 A1 | 3/2008 | Langlois et al. |
| 2008/0085212 A1 | 4/2008 | Adams et al. |
| 2008/0105597 A1* | 5/2008 | Miller et al. ................... 209/1 |
| 2008/0156703 A1 | 7/2008 | Kenny |
| 2008/0197056 A1 | 8/2008 | Kenny |
| 2008/0197058 A1* | 8/2008 | Kenny ................... 209/672 |
| 2008/0237093 A1 | 10/2008 | Bohlig et al. |
| 2009/0114571 A1 | 5/2009 | Miller et al. |

FOREIGN PATENT DOCUMENTS

| | | |
|---|---|---|
| EP | 0439674 | 8/1991 |
| GB | 1450940 | 9/1976 |
| GB | 1528236 | 10/1978 |
| GB | 2395887 | 6/2004 |
| GB | 2419551 | 5/2006 |
| JP | 2001-058846 | 3/2001 |
| JP | 2001-189203 | 7/2001 |
| WO | WO-03/086733 | 10/2003 |

OTHER PUBLICATIONS

European Search Report for European Patent Application No. 05254328.7, dated Jan. 11, 2006.
Office Action for U.S. Appl. No. 10/989,604, mailed Oct. 5, 2006.
International Preliminary Report on Patentability for International Application No. PCT/US2005/024687, dated Jan. 29, 2008.
Office Action for U.S. Appl. No. 11/106,634, mailed Sep. 26, 2006.
Office Action for U.S. Appl. No. 11/106,634, mailed May 4, 2007.
International Preliminary Report on Patentability for International Application No. PCT/US2005/024681, dated Jan. 23, 2007.
Office Action for U.S. Appl. No. 11/487,372, mailed May 9, 2008.
International Preliminary Report on Patentability for International Application No. PCT/US2008/062249, dated Nov. 24, 2009.
Aug. 1, 1992, "Einsatz Von Mogensen Vibro-Stangensizer Beim Altglas-Recycling," Aufbereitungs Technik, Verlag Fuer Aufbereitungs, Weisbaden, DE, XP000256701. ISSN: 004-783X, p. 460-462 and Figure 2.
US 5,041,996, 08/1991, Emering (withdrawn).
Tim Goodman & Associates, Aug. 11, 2003, Materials Recovery Facilities Operational Assessment Final Report and Optimization Guide.
European Search Report for European Patent Application No. 05254327.9 mailed Oct. 25, 2005.
European Partial Search Report for European Patent Application No. 05254328.7 mailed Nov. 21, 2005.
Form PCT/ISA/220: Notification of Transmittal of the International Search Report and Written Opinion, Dec. 4, 2006.

Form PCT/ISA/210: International Search Report from corresponding PCT Application No. PCT/US2005/039464 dated Dec. 4, 2006.
Form PCT/ISA/237: Written Opinion of corresponding PCT Application No. PCT/US2005/039464 dated Dec. 4, 2006.
Capel et al. "Waste sorting—a look at the separation and sorting techniques in today's european market." Waste Management World Magazine (Available online at http://www.waste-management-world.com/display_article/339838/123/CRTIS/none) Jul. 2008 (6 pages).
Duckett, E., "The Influence of Color Mixture on the Use of Glass Cullett Recovered from Municipal Solid Waste" Conservation & Recycling, vol. 3, No. 2(1979) (18 pages).
Envirosris Knowledge Innovative Solutions, "Final Report—Material Recycling Facility Technology Review—WDO Project Code OPT-R3-05," The City of Ottawa, Jul. 2001 (38 pages).
European Search Report for European Patent Application No. 05256769 dated Jan. 13, 2006 (2 pages).
eWasteTech.com News "Crisp County Build New Waste Processing Plant." (Available online at http://www.ewastetech.com/pr02.htm) Aug. 1997 (1 page).
Hendrix, et al. "Technologies for the Identification, Separation, and Recycling of Automotive Plastics." International Journal of Environmentally Conscious Design and Manufacturing Mar. 1996 (24 pages).
Lotfi, A. "Plastic Recycling," Plastic/Polymer Recycling. (Available online at http://www.lotfi.net/recycle/plastic.html) Applied Spectroscopy, Jun. 1997 (17 pages).

MEEF Plastic Recycling, "Plastic Recycling—The Problem with PVC," (Available online at http://www.engforum.com/recycling/PVC.htm) Mar. 7, 2006 (4 pages).
PCT/US05/24681 International Search Report mailed Dec. 20, 2006 (2 pages).
PCT/US05/24687 International Search Report mailed Jan. 4, 2008 (4 pages).
PCT/US08/062249 International Search Report mailed Aug. 14, 2008 (2 pages).
R.E.D. Recycling Engineering & Development Ltd. "Scrap Metal Processing, Down Stream Systems." (Available online at http://www.redltd.co.uk/scrap_metal.php4) 2009 (4 pages).
Ramasubramanian et al. "Sensor Systems for high speed intelligent sorting of waste paper in recycling," North Carolina State University (28 pages), 2007.
RRT Design & Construction. "Technologies & Products—Product Diversity." (Available online at http://web.archive.org/web/20080207032542/www.rrtenviro.com) 2003 (7 pages).
Solano et al. "Life-cycle based solid waste management. I: Model Development," J. of Environmental Engineering, Oct. 2002 (12 pages).
TiTech, "TiTechPolySort," (Available online at http://www.titech.com/default.asp?V_ITEM_ID=484) 2006 (5 pages).
Wahab et al. "Development of a Prototype Automated Sorting System for Recycling." Amer. J. of App. Sciences. 3:7 (5 pages), 2006.

* cited by examiner

| Weight per unit volume (Pounds per cubic yard) | Non-fiber items (Plastic/metal/glass containers) | Fiber items |
|---|---|---|
| 160-220 | 75%-100% move recyclable items on container transfer conveyor 116b and glass sorting and conveying system 120 at relatively slow speeds | Negligible-25% move recyclable items on infeed and manual pre-sort conveying system 106 and fiber transfer conveyor 116a at relatively fast speeds |
| 220-280 | 50%-75% move recyclable items on container transfer conveyor 116b and glass sorting and conveying system 120 at first and second speeds that are respectively faster than the relatively slow speeds | 25%-50% move recyclable items on infeed and manual pre-sort conveying system 106 and fiber transfer conveyor 116a at fifth and sixth speeds that are respectively slower than the relatively fast speeds |
| 280-340 | 25%-50% move recyclable items on container transfer conveyor 116b and glass sorting and conveying system 120 at third and fourth speeds that are respectively faster than the first and second speeds | 50%-75% move recyclable items on infeed and manual pre-sort conveying system 106 and fiber transfer conveyor 116a at seventh and eighth speeds that are respectively slower than the fifth and sixth speeds |
| 340-400 | Negligible-25% move recyclable items on container transfer conveyor 116b and glass sorting and conveying system 120 at speeds that are respectively faster than the third and fourth speeds | 75%-100% move recyclable items on infeed and manual pre-sort conveying system 106 and fiber transfer conveyor 116a at speeds that are respectively slower than the seventh and eighth speeds |

FIG. 4

SYSTEMS AND METHODS FOR OPTIMIZING A SINGLE-STREAM MATERIALS RECOVERY FACILITY

RELATED APPLICATIONS

This application is related to application Ser. No. 10/989,604, filed Nov. 17, 2004, application Ser. No. 11/487,372, filed Jul. 17, 2006, application Ser. No. 11/106,634, filed Apr. 15, 2005, and application Ser. No. 11/135,291, filed May 24, 2005, each of which is incorporated herein by reference in its entirety.

BACKGROUND OF THE INVENTION

1. Field of the Invention

Embodiments of the present invention relate to an automated single-stream material recovery facility (SSMRF). In particular, embodiments of the present invention relate to systems and methods for improving the flow of a recyclable product stream in a SSMRF.

2. Background Description

Waste management companies provide residential, commercial, and municipal waste management and recycling services for communities and organizations. Consumers include, for example, residential, industrial, and business customers. A waste management service provider may be utilized by municipalities to handle their municipal solid waste (MSW) and/or to provide recycling services for the municipalities.

MSW is refuse and recyclable materials that result, for example, from residential, commercial, industrial, and community activities. Often, municipalities require or encourage recycling selected materials such as plastic, aluminum, paper, cardboard, and glass. Generally, these materials are picked up by either a waste management company or a municipality and may be taken to an SSMRF, where mixed recyclable materials are separated. Once separated, materials may be segregated into various qualities and categories, depending upon SSMRF configuration. For example, clear glass may be removed from colored glass, certain grades of paper may be separated from cardboard, and plastic may be separated by type and color. Materials such as plastic, aluminum, paper and cardboard may then be compressed into bales using standard equipment and procedures.

Recyclable materials entering a SSMRF can include a mixture of recyclable items such as glass, plastics, and/or metal containers (collectively referred to herein as commingled containers), old newsprint (ONP), old corrugated containers (OCCs), and/or office paper (collectively referred to herein as fiber material). Within a SSMRF, various conveying systems can be used to transport recyclable item streams to various sorting stations where the recyclable items are sorted, either manually and/or by use of certain equipment. A stream of recyclable items entering a SSMRF can subsequently be separated into multiple streams for sorting. For example, an original stream of recyclable items can be separated into a stream of fiber material items and a stream of commingled containers. Then, for example, workers at a fiber sorting station or automated separating equipment can remove office paper items from the stream of fiber items, while a glass sorting station can remove glass containers from the stream of commingled containers.

However, because the relative percentage of various types of recyclable items in the original stream can vary, some sorting stations can experience a "pile-up" or backlog of items they need to process, while other sorting stations become idle or under-utilized. For example, when the original stream of recyclable items includes predominantly fiber items, a fiber sorting station may experience a backlog while a glass sorting station may be idle or substantially underutilized. This decreases the overall throughput of the SSMRF relative to a situation in which the fiber sorting station and the glass sorting station are both processing their respective fiber and glass items at or near capacity. In addition, the quality of fiber generated from the sorting stations during a period of backlog or pile-up can be adversely affected.

We have discovered that systems and methods for adjusting the speeds (and/or other operational aspects) of one or more conveyance systems in a SSMRF to purposefully regulate material flow can be utilized to provide improved operational efficiencies, realize higher throughput, and increase the quality of sorted recyclable material produced by the SSMRF. Embodiments of the present invention are directed to these and other objectives.

SUMMARY OF EMBODIMENTS OF THE INVENTION

Embodiments of the present invention provide systems and methods for sorting recyclable items in a single-stream materials recovery facility (SSMRF). In one embodiment, a system can include an infeed conveying system configured to receive and transport recyclable items. One or more screens can be configured to receive the recyclable items from the infeed conveying system and remove at least a portion of fiber items from the recyclable items. A fiber transfer conveyor can be configured to receive items from the screens and facilitate manual and/or automated removal of remaining fiber items.

The system can further include a container transfer conveyor configured to receive and move non-fiber items from the screens, and a ferrous sorting and conveying system configured to receive the non-fiber items from the container transfer conveyor and remove ferrous container items from the non-fiber items. A glass sorting and conveying system can also be provided and configured to receive non-ferrous items from the ferrous sorting and conveying system and remove glass container items from the non-ferrous items. One or more plastic sorting and conveying system can be configured to receive non-glass items from the glass sorting and conveying system and remove plastic items from the non-glass items.

The system may further include a controller configured to estimate a percent weight of fiber items and a percent weight of non-fiber items. Based on the estimate, the controller can i) adjust the speed of the infeed conveying system, ii) adjust the speed of the fiber transfer conveyor, iii) adjust the speed of the container transfer conveyor, and/or iv) adjust the speed of the glass sorting and conveying system.

In one or more embodiments, when the percent weight of fiber items exceeds a predetermined threshold, the controller can decrease the speed of the infeed conveying system and/or the speed of the fiber transfer conveyor, and/or increase the speed of the container transfer conveyor and/or the speed of the glass sorting and conveying system. Similarly, when the percent weight of non-fiber items exceeds a predetermined threshold, the controller can increase the speed of the infeed conveying system and/or the speed of the variable fiber transfer conveyor, and/or decrease the speed of the container transfer conveyor and/or the speed of the glass sorting and conveying system.

In another embodiment, the infeed conveying system includes: i) a substantially horizontal infeed conveyor, ii) an angled and upfeed conveyor that receives input from the substantially horizontal infeed conveyor, and iii) a substantially horizontal manual pre-sort conveyor that receives an input from the angled and upfeed conveyor, and facilitates manual sorting of the plurality of recyclable items.

In some embodiments, the controller of the system can be configured to estimate a weight per unit volume (i.e., density) for the recyclable items. In one embodiment, the system can include a scale for measuring the total weight of recyclable items on the infeed conveying system. In another embodiment, the system can include a detector for measuring an average depth of the recyclable items at the infeed conveying system, and the controller is further configured to estimate a total volume of the recyclable items using the measured average depth.

In some embodiments, the controller is configured to keep the speed of the infeed conveying system, the speed of the fiber transfer conveyor, the speed of the container transfer conveyor, and/or the speed of the glass sorting and conveying system above minimum threshold speeds that are required for finish processing of the recyclable items within a predetermined time period. In these embodiments, when the estimated percent weight of fiber items increases from a previous estimate (and/or with respect to a, predetermined threshold), the controller can decrease the speed of the infeed conveying system and/or the speed of the fiber transfer conveyor, and/or increase the speed of the container transfer conveyor and the speed of the glass sorting and conveying system. When the estimated percent weight of non-fiber items increases from a previous estimate (and/or with respect to a predetermined threshold), the controller can decrease the speed of the container transfer conveyor and/or the speed of the glass sorting and conveying system, and/or increase the speed of the infeed conveying system and/or the speed of the fiber transfer conveyor.

In some embodiments, the system can include one or more surge hoppers configured to temporarily store recyclable items at the infeed conveying system, the fiber transfer conveyor, the container transfer conveyor, and/or the glass sorting and conveying system. In one embodiment, the system can further include a measuring device configured to measure material levels in the surge hoppers and send the measurements to the controller. Based on these measurements, the controller can control the speed of the infeed conveying system, the speed of the fiber transfer conveyor, the speed of the container transfer conveyor, and/or the speed of the glass sorting and conveying system.

In some embodiments, the system can include a non-ferrous metal sorting and conveying system configured to receive an output from the plastic sorting and conveying system and remove non-ferrous metal container items.

Methods for sorting a plurality of recyclable items in a SSMRF are also provided. In one embodiment, a method can include receiving and pre-sorting recyclable items at an infeed conveying system, separating fiber and non-fiber items from the pre-sorted recyclable items using one or more screens, and receiving and transporting the separated fiber items using a fiber transfer conveyor. In addition, non-fiber items can be received separately and transported to a ferrous sorting and conveying system using a container transfer conveyor, where ferrous container items are removed from the non-fiber items.

The method can further include transporting remaining non-ferrous container items to a glass sorting and conveying system, removing glass container items from the non-ferrous items. In addition, the method can include estimating a percent weight of fiber items and a percent weight of non-fiber items. Based on the estimates, the speed of the infeed conveying system, the speed of the fiber transfer conveyor, the speed of the container transfer conveyor, and/or the speed of the glass sorting and conveying system can be controlled.

In some embodiments, the speed of the infeed conveying system, the speed of the fiber transfer conveyor, the speed of the container transfer conveyor, and/or the speed of the glass sorting and conveying system are controlled to be above minimum threshold speeds required for finish sorting the recyclable items within a predetermined period of time.

In these embodiments, the method can further include decreasing the speed of the infeed conveying system and/or the fiber transfer conveyor when the estimated percent weight of fiber items increases from a previous estimate (and/or with respect to a predetermined threshold), and/or increasing the speed of the container transfer conveyor and/or the glass sorting and conveying system when the estimated percent weight of fiber items increases from a previous estimate (and/or with respect to a predetermined threshold). Similarly, the method can include decreasing the speed of the container transfer conveyor and/or the glass sorting and conveying system, and/or increasing the speed of the infeed conveying system and/or the fiber transfer conveyor, when the estimated percent weight of non-fiber items increases from a previous estimate (and/or with respect to a predetermined threshold).

In some embodiments, a method in accordance with an embodiment of the present invention can include obtaining a total weight and a total volume of the plurality of recyclable items on the infeed conveying system, determining a weight per unit volume of the recyclable items, and estimating the percent weight of fiber items and the percent weight of non-fiber based on the determined weight per unit volume. In one embodiment, the method can further include measuring an average depth of the recyclable items at the infeed conveying system for obtaining the total volume of the recyclable items.

In some embodiments, a system can include a fiber transfer conveyor configured to receive recyclable items from one or more screens and facilitate manual removal of fiber items in the recyclable items, and a ferrous sorting and conveying system configured to receive non-fiber items from the screens and remove ferrous container items from the non-fiber items. The system can also include a glass sorting and conveying system configured to receive non-ferrous items from the ferrous sorting and conveying system and remove glass container items from the non-ferrous items. Further, the system can include a controller configured to estimate, prior to receiving the recyclable items by the screens, a percent weight of fiber items and a percent weight of non-fiber items, and control, based on the estimate, the speed of the fiber transfer conveyor and/or the speed of the glass sorting and conveying system.

In some embodiments, the system can include a container transfer conveyor configured to receive and transport non-fiber items from the one or more screens to the ferrous sorting and conveying system. In one embodiment, the controller in the system can be configured to control, based on the estimate, the speed of the container transfer conveyor.

In some embodiments, the controller can estimate a percent weight of fiber items and a percent weight of non-fiber items by using at least a first weight, a second weight, a first volume, and a second volume. In one embodiment, the first weight and the first volume are measured at substantially the same time.

In some embodiments, a method can include receiving recyclable items on a fiber transfer conveyor from one or more screens that removes at least a portion of fiber items from the recyclable items, receiving non-fiber items from the one or more screens, and removing ferrous container items from the non-fiber items. Further, the method can include receiving on a glass transfer conveyor remaining non-ferrous items, and, subsequent to the receiving on a glass transfer conveyor, removing glass items from the remaining non-ferrous items. The method can also include estimating, prior to receiving recyclable items on the fiber transfer conveyor, a percent weight of fiber items and a percent weight of non-fiber items, and controlling, based on the estimate, a speed of the fiber transfer conveyor, and/or a speed of the glass transfer conveyor system.

In some embodiments, the controlling step includes estimating a percent weight of fiber items and a percent weight of non-fiber items by using at least a first weight, a second weight, a first volume, and a second volume. In one embodiment, the first weight and the first volume can be measured at substantially the same time.

BRIEF DESCRIPTION OF THE DRAWINGS

The Detailed Description of the Invention, including the description of various embodiments of the invention, will be best understood when read in reference to the following figures.

FIG. 4 is an exemplary table illustrating the operation of a system in accordance with various embodiments of the present invention.

DETAILED DESCRIPTION OF THE INVENTION

Although the following discussion is given in the context of automated SSMRF operations, it will be appreciated that various aspects and embodiments of the present invention can be utilized in various industries and/or contexts.

Figure 1:
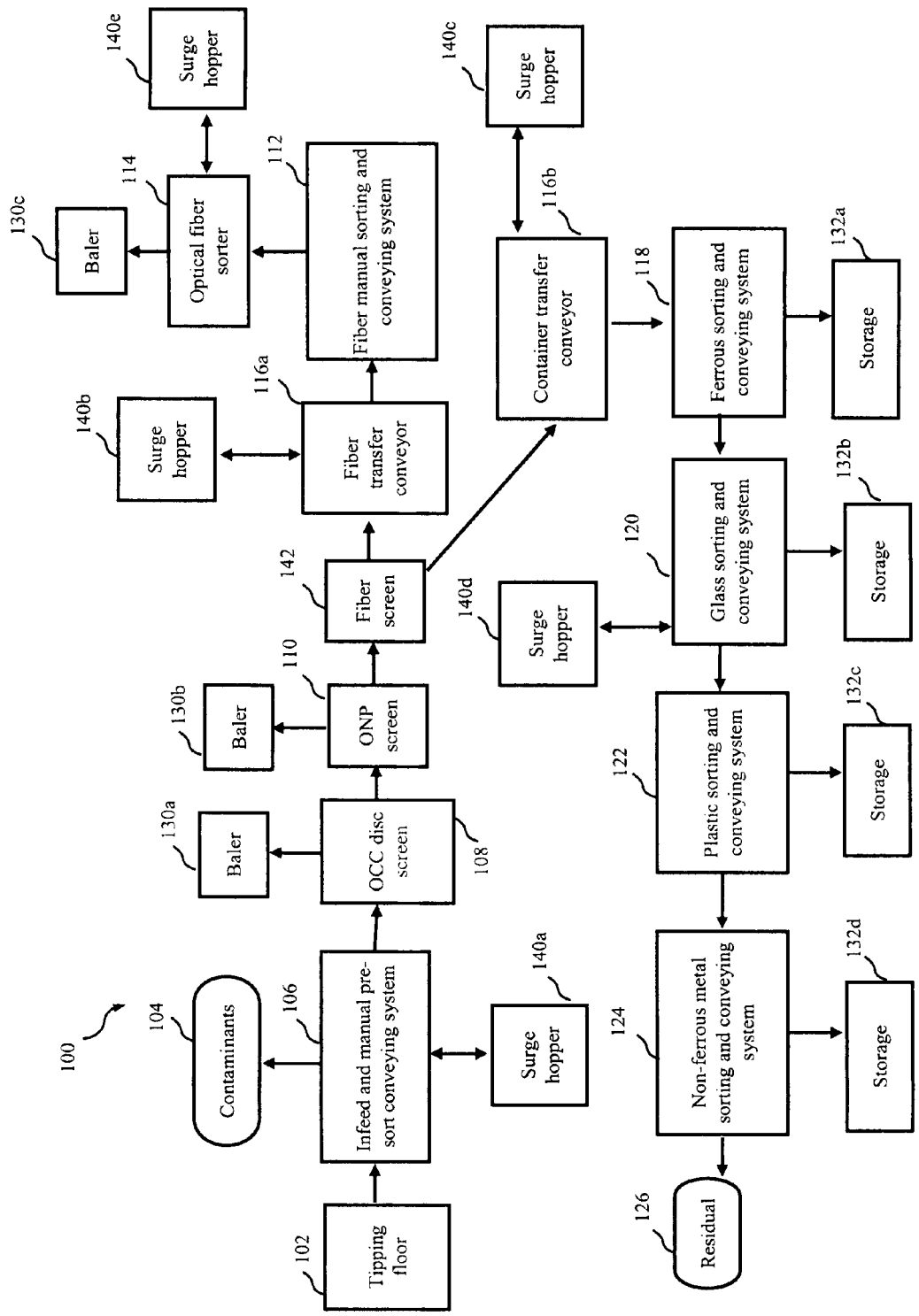
FIG. 1 is an exemplary block diagram of various embodiments of the present invention and a flow of recyclable items among various components.

FIG. 1 is an exemplary block diagram of a system 100 in accordance with various embodiments of the present invention. The arrows in FIG. 1 indicate the flow of various recyclable items at certain points between various components of system 100.

Infeed conveying system 106 can be configured to receive recyclable items (not shown) from tipping floor 102 and transport the recyclable items. After the recyclable items have been received by conveying system 106, contaminants 104 may be manually or mechanically separated and removed from the recyclable items. Conveying system 106 can transport remaining recyclable items to one or more screens such as old corrugated container (OCC) disc screen 108 and, subsequently, to old newsprint (ONP) screen 110 as shown. Screens 108 and 110 can be configured to remove certain types of fiber items from the recyclable items. Surge hopper 140a may be used to temporarily store items not placed on system 106.

OCC disc screen 108 can be used, for example, to screen out large size items (e.g., cardboard boxes). OCC disc screen 108 can include a plurality of discs that rotate and impart, for example, a wavelike motion that causes larger object such as OCC to move upwards, away from the remainder of the recyclable items. OCC disk screen 108 can utilize, for example, serrated elliptical disks made out of ½-inch thick steel plate. The size of the disks can be changed, and the space between disks or rows of disks can be varied to adapt to the stream of recyclable items. OCC disk screen 108 can be, for example, a screen manufactured by CP Manufacturing Inc., National City, Calif.

ONP screen 110 can be used to screen out medium sized two-dimensional items (e.g., newspaper) from the recyclable item stream. ONP screen 110 can be a standard dual screen separator, which pulls newspapers and standard newspaper inserts from the recyclable items across its upper deck, and separates out the other items through, for example, one or more decks. ONP screen 110 can be, for example, NEWScreen™ manufactured by CP Manufacturing Inc., National City, Calif., may be used.

Materials separated out by screens 108 and 110 may be sent to balers 130a and 130b, respectively, for baling, or to storage bunkers to await baling, using standard techniques and equipment. The bales can be sent, for example, to local, national, and global reprocessors to be recycled. Balers 130a, 130b (and other balers in the system) can be Apollo TR-7/30 models manufactured by Marathon Equipment Company, Vernon, Ala.

After materials are removed by screens 108 and 110, remaining recyclable items can be transported to a fiber screen 142, where remaining fiber items and non-fiber items can be separated. Fiber screen 142 can be a standard screening mechanism that screens out all, or substantially all, of any remaining smaller fiber materials such as labels, and sheets of paper that are not removed by OCC disc screen 108 and ONP screen 110. Fiber screen 142 can carry or lift fiber items over discs. Non-fiber items that are not lifted or carried up by the discs can be plastics, metals and glass containers that roll off or pass through the discs. Fiber screen 142 can be, for example, the Mach 1 Fiber Sorter, from Machinex Technologies, Inc., Chicago, Ill.

Fiber items separated out by fiber screen 142 can be discharged into surge hopper 140b and/or received by and transported using fiber transfer conveyor 116a which by using speed differential to lower burden depth, can, for example, facilitate manual removal of remaining fiber items. Conveyor 116a can transport the fiber items to a fiber manual sorting and conveying system 112 where the fiber items are manually sorted to remove unwanted items from the fiber items. In addition to manual sorting, an optical fiber sorter 114 may be used to image the stream of recyclable items, remove unwanted material from the stream, and/or classify desired material into separate categories that are designated by grade or type. Optical fiber sorter 114 can be, for example, a PaperSort™ System, manufactured by Magnetic Separation Systems Inc., Nashville, Tenn. Sorted fiber items may be stored temporarily and may be baled using baler 130c. Sorted fiber items may also be conveyed to an alternative baler for baling.

Non-fiber items screened out by fiber screen 142 can be discharged into surge hopper 140c and/or received and transported by container transfer conveyor 116b to ferrous sorting and conveying system 118, which removes ferrous items (e.g., containers) from the non-fiber items.

Ferrous sorting and conveying system 118 can include a standard, industrial magnetic or electromagnetic separator that separates and removes ferrous material from the stream of non-fiber items. For example, system 118 can include a magnetic belt separator (not shown) that moves like a conveyor belt and carries non-fiber items to a stripper magnet that will remove the ferrous items from the non-fiber materials through controlled discharge. A stainless steel section may be utilized for maximum magnet effectiveness. System 118 may include, for example, a magnetic drum ferrous separator manufactured by Eriez Magnetics, Erie, Pa. Ferrous items may be sent to and stored at storage 132a.

After removing ferrous items, non-ferrous items can be transported to glass sorting and conveying system 120, which removes glass container items from the stream of non-ferrous items. System 120 may include a glass disc screen/breaker (not shown), which can be a two-level disc screen having metal discs, that separates and breaks up glass items. Glass items may drop onto the metal discs, and the broken glass may fall through the screen (or discs), for example, onto a separate conveyor belt. The conveyor belt can then transport the broken glass to be stored at storage 132b or processed further to prepare the material for sale in specific end markets.

Remaining non-glass items out of system 120 may be sent to plastic sorting and conveying system 122, which removes plastic items from the recyclable item stream. Plastic sorting and conveying system 122 can include, for example, a TiTech PolySort® system, from TiTech Norway, Oslo, Norway. Such a sorting system can separate, for example, polyethylene terephthalate (PET or PETE), polystyrene (PS), polypropylene (PP), polyvinyl chloride (PVC), expanded polystyrene (EPS), glycol (G), and mixed plastic polymers containers. As another example, plastic sorting and conveying system 122 can include a system such as MSS Aladdin™ system from MSS, Inc., Nashville, Tenn., which can separate natural high density polyethylene (HDPE), colored HDPE, and other types of plastic containers by color. Plastic items may also be sorted manually. Sorted plastic containers can be stored at storage 132c.

Remaining recyclable items may be sent to a non-ferrous metal sorting and conveying system 124 configured to remove non-ferrous metal containers from the remaining items. System 124 can include, for example, an eddy-current separator, which separates non-ferrous metal (e.g., aluminum cans) from the remaining items. A non-ferrous separator such as a Ferrite Rotor eddy current separator manufactured by Eriez Magnetics, Erie, Pa., may be used. Non-ferrous metal items can be stored at storage 132d.

Figure 2:
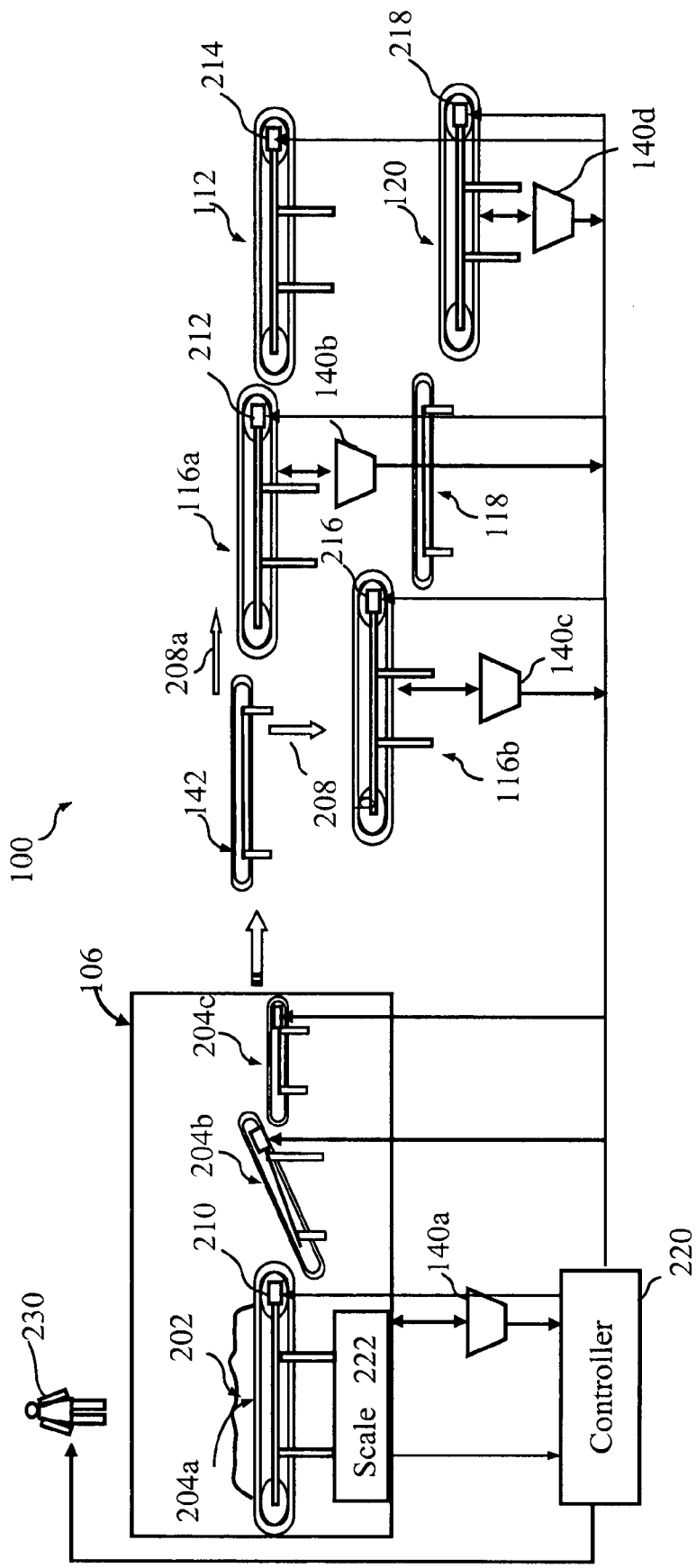
FIG. 2 is an exemplary diagram illustrating portions of the system shown in FIG. 1.

The speeds of infeed conveying system 106, fiber transfer conveyor 116a, container transfer conveyor 116b, glass sorting and conveying system 120, and/or other components in the system may be controlled by controller 220, shown in FIG. 2. In some embodiments, the speeds at which recyclable items are transported by system 106, conveyors 116a 116b, and system 120 can be adjusted, allowing system 100 to process recyclable items in a more efficient (e.g., realize a higher throughput) optimized manner. For example, system 100 can adjust the speeds to minimize backlog of recyclable items, and/or to ensure the quality of the sorting process. Various surge hoppers (e.g., surge hoppers 140a, 140b, 140c, 140d) may be installed together with various components of system 100 (e.g., system 106, conveyors 116a and 116b, system 120) to temporarily store recyclable items to accommodate temporary surge conditions at the various components.

FIG. 2 is an exemplary diagram illustrating additional features of system 100. As shown, system 100 can include controller 220, infeed conveying system 106, fiber transfer conveyor 116a, container transfer conveyor 116b, and glass sorting and conveying system 120. Conveying systems and conveyors 106, 116a, 116b, and 120 can respectively have motors 210, 212, 216, and 218. Controller 220 controls the speed of motors 210, 212, 216, and 218 for controlling the speed of systems 106, 116a, 116b, and 120.

Various surge hoppers (e.g., surge hoppers 140a, 140b, 140c, 140d) may be installed together with various components of system 100 (e.g., systems and conveyors 106, 116a, 116b, and 120). To accommodate temporary surge conditions, controller 220 can monitor material level in each surge hopper in system 100 and may use this information to adjust the speed of various components of system 100 (e.g., systems and conveyors 106, 116a, 116b, and 120). For example, the weight of one or more surge hoppers 140a-d can be provided to controller 220. Controller 220 may also send this information to tip floor operator 230, enabling him or her to change the composition of new material being placed on the infeed conveying system 106.

For example, if controller 220 detects that surge hopper 140b associated with fiber transfer conveyor 116a has a high level of material (e.g., a relatively high weight), which indicates a backup of fiber items, controller 220 may increase the speed of conveyor 116a to reduce the surge condition. Controller 220 may also send this information to tip floor operator 230 so that operator 230 can start placing material with less fiber content on the infeed conveying system 106 until the surge condition is reduced.

Infeed conveying system 106 receives recyclable items 202. System 106 can include, for example, a substantially horizontal infeed conveyor 204a, an angled and upfeed conveyor 204b that receives input from infeed conveyor 204a, and a substantially horizontal manual pre-sort conveyor 204c that receives input from upfeed conveyor 204b and facilitates manual sorting of the recyclable items. In some embodiments, the speeds of conveyors 204a, 204b, and 204c may be controlled by controller 220.

System 100 can also include fiber screen 142, which separates fiber items from non-fiber items. Fiber items, illustrated by arrow 208a, can be sent to conveyor 116a, and/or stored in surge hopper 140b. Non-fiber items, illustrated by arrow 208b, can be sent to conveyor 116b, and/or stored in surge hopper 140c. Scale 222 weighs recyclable items 202 at infeed conveying system 106, and transmits the measured weight to controller 220.

In some embodiments, for a quantity of recyclable items received at infeed conveying system 106, controller 220 estimates a percent weight of fiber items and a percent weight of non-fiber items, relative to the total weight of recyclable items 202. The estimate can be based on the total weight and total volume of the recyclable items, as will be described in connection with FIGS. 3 and 4. Controller 220 can adjust speed of systems 106 and 120, and conveyors 116a and 116b based on this estimate and/or previous estimates relating to previously received quantities of recyclable items.

Figure 3:
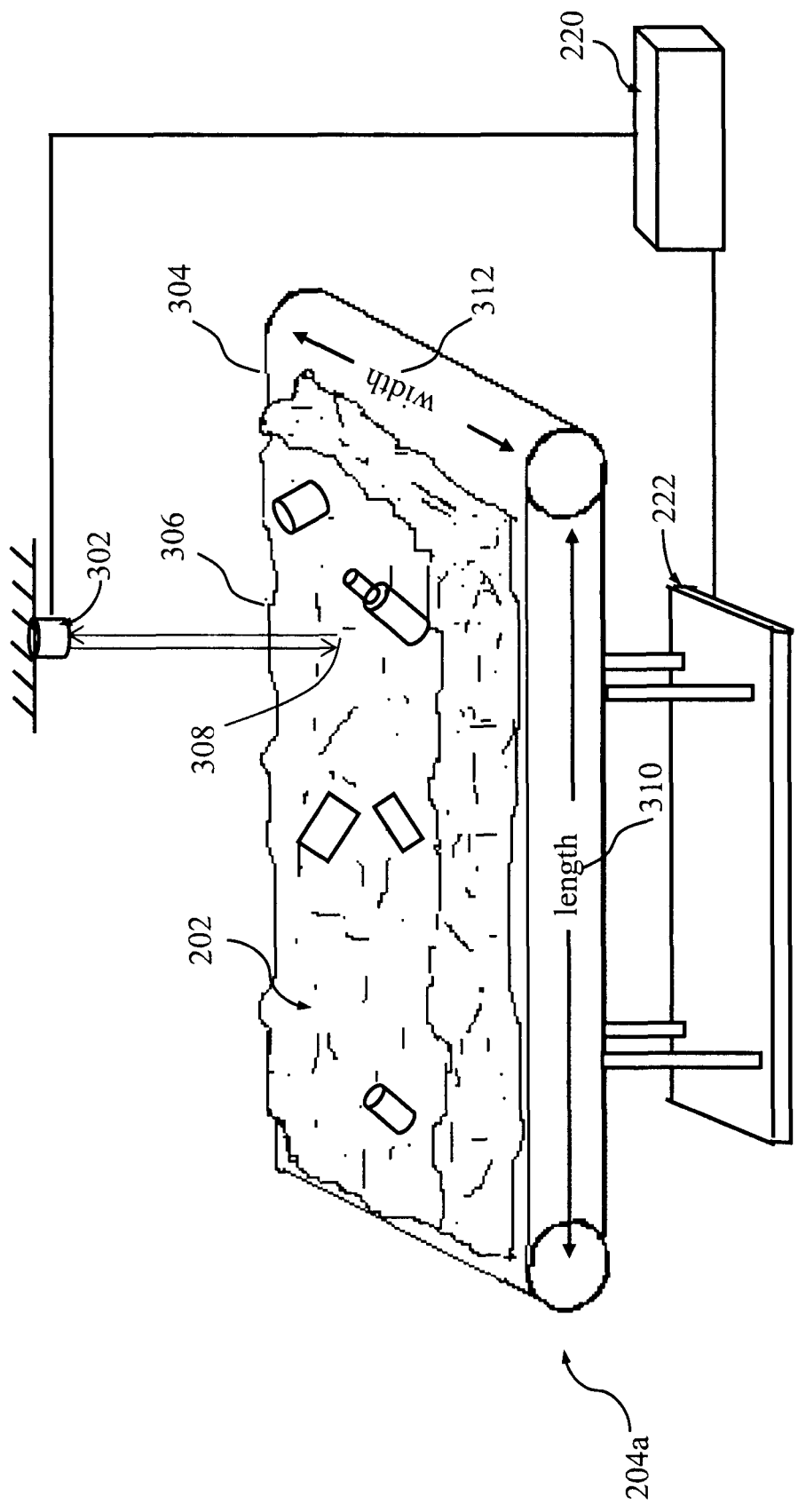
FIG. 3 is an exemplary perspective view of a portion of the system illustrated in FIG. 1.

FIG. 3 is an exemplary perspective view of infeed conveyor 204a (of infeed conveying system 106). As shown, conveyor 204a receives load of recyclable items 202, which can be deposited on top of an upper surface 304 of conveyor 204a. Scale 222 measures the total weight of recyclable items 202, and transmits the measured total weight to controller 220.

Optical detector 302 may be used to measure an average height of the layer of recyclable items 202. Detector 302 can be operably connected to controller 220, and can transmit measured results to controller 220. For example, detector 302 can be located above recyclable items 202, and make multiple measurements of distances between detector 302 and various points (e.g., point 308) on an upper surface 306 of the layer of recyclable items 202. These measurements may be communicated from detector 302 to controller 220. Knowing the predetermined distance between detector 302 and upper surface 304 of conveyor 204a, controller 220 can calculate or estimate an average height of the layer of recyclable items 202. For example, for a given conveyor 204a speed, detector 302 may measure the height of recyclable items 202 at point 308 once every second for five seconds, and use the average height of recyclable items 202 calculated during this time. Other techniques using, for example, a larger or smaller number of samples at the same or different (larger or smaller) sampling internals, are also contemplated.

Using the calculated (average) height of the layer of recyclable items 202 and an area of upper surface 304 of conveyor 204a, as shown by length 310 and width 312, controller 220 can estimate the total volume of recyclable items 202. In particular, the total volume of recyclable items 202 equals length 310 multiplied by width 312 and multiplied by the calculated (average) height.

In one embodiment, the weight per unit volume (density) of recyclable items 202 can be calculated by recording the weight recorded by scale 222 at, for example, five 1-second intervals, and dividing that sum of weights by the sum of estimated volumes computed at the same (corresponding) five 1-second intervals. Table 1 illustrates an example of weight measurements recorded by scale 222, and height measurements recorded by detector 302, during a five second interval. A weight measurement recorded by scale 222 can be synchronized with a corresponding height measurement recorded by detector 302. In Table 1, five estimated volumes are calculated. With respect to the calculations performed in connection with Table 1, it is assumed that the length 310 of conveyor 204a is approximately 3 yards and width 312 of conveyor 204a is approximately 1 yard.

TABLE 1

| Time (seconds) | Height (feet) | Volume (cubic yards) | Weight (pounds) |
| --- | --- | --- | --- |
| 1 | 2.4 | 2.4 | 755 |
| 2 | 2.8 | 2.8 | 786 |
| 3 | 2.3 | 2.3 | 741 |
| 4 | 2.5 | 2.5 | 749 |
| 5 | 2.6 | 2.6 | 765 |

For the example given in Table 1, the sum of the five calculated volumes is 12.6 cubic yards, and the sum of the five weights is 3796 pounds. Therefore, the average density (weight divided by volume) of recyclable items 202 during the five second interval can be obtained as 3796 pounds/12.6 yd$^3$=301.3 pounds/yd$^3$. Of course, in one embodiment of the invention, only one weight and volume calculation may be utilized for a given time duration to estimate the density of recyclable items 202. Thus, embodiments of the invention contemplate that 1 calculation, 5 calculation, as well as other numbers of calculations (e.g., 2, 3, 4, 6, 7) be performed to estimate the weight per unit volume (density) of recyclable items 202 for a given time duration. In addition, time intervals other than one second may be utilized. For example, time intervals, for example, of one-half second, two seconds, four seconds, five seconds, and ten seconds may be used.

Based on the estimated weight per unit volume of recyclable items 202, controller 220 can further estimate a percent weight of fiber items and a percent weight of non-fiber items relative to the total weight, as illustrated in FIG. 4. This is because fiber items alone and non-fiber items alone will typically have substantially different densities. For example, assume that fiber items alone generally weigh on average, approximately 400 pounds per cubic yard, and non-fiber items (e.g., a combination of plastic, metal and glass containers) generally weigh on average, approximately 160 pounds per cubic yard. If a mixture of fiber items and non-fiber items weighs 280 pounds per cubic yard, then it can be determined that approximately half of the mixture is made up of fiber items, and the other half is made up of non-fiber items. Using the example associated with Table 1, since the estimated density of recyclable items 202 is 301.3 pounds/yd$^3$, FIG. 4 indicates that approximately 25%-50% of the recyclable items 202 are non-fiber items, and approximately 50%-75% of the recyclable items 202 are fiber items.

As shown in FIG. 4, if the weight per unit volume of recyclable items 202 is estimated to be between 160 to 220 pounds per cubic yard, a percent weight of the non-fiber items relative to the total weight may be estimated to be between approximately 75% and 100%, and a percent weight of the fiber items may be estimated to be at or below approximately 25%. Similarly, if the weight per unit volume is estimated to be between 220 to 280 pounds per cubic yard, it may be estimated that approximately 50%-75% of recyclable items 202 are non-fiber items. If the weight per unit volume is estimated to be between 280 to 340 pounds per cubic yard, it may be estimated that approximately 25%-50% of recyclable items 202 are non-fiber items. If the weight per unit volume is estimated to be between 340 to 400 pounds per cubic yard, it may be estimated that less than approximately 25% of recyclable items 202 are non-fiber items. Therefore, for the example given in Table 1, because weight per unit volume of recyclable items 202 is estimated to be 301.3 pounds per cubic yard, it may be estimated that approximately 25%-50% of recyclable items 202 are non-fiber items, and 50%-75% of recyclable items 202 are fiber items.

Based on the estimated weight percent of fiber and non-fiber items, controller 220 can control the speed of various components of system 100, including, for example, infeed conveying system 106, fiber transfer conveyor 116a, container transfer conveyor 116b, and/or glass sorting and conveying system 120, to adjust the flow of recyclable items 202. As shown in FIG. 4, when, for example, more than approximately 75% of recyclable items 202 are non-fiber items, container transfer conveyor 116b and glass sorting and conveying system 120 can be adjusted to operate at relatively slow speeds, so that workers or machinery that sort the non-fiber items have sufficient time to process the stream of recyclable items. This can ensure a desired quality of sorted non-fiber items. In this case, because less than approximately 25% of recyclable items 202 are fiber items, conveying system 106 and/or fiber transfer conveyor 116a may be adjusted to relatively fast speeds and still allow workers or machinery sufficient time to sort the fiber items (e.g., fiber transfer conveyor 116a and/or fiber manual sorting and conveying system 112).

Controller 220 may also send the estimated weight percent (as well as material levels in surge hoppers 114a-e) to tip floor operator 230, who can then make adjustments in the new material (recyclable items 202) placed on the infeed conveying system 106. For example, if more than approximately 75% of recyclable items 202 are non-fiber items, tip floor operator 230 may start placing new material that includes a lower percentage of non-fiber items on system 106. This helps to reduce any existing or potential surges of non-fiber items in system 100. Controller 220 can make the weight percent estimates at predetermined time intervals (e.g., every minute), and each weight percent estimate can be based on multiple weight and/or volume related measurements as illustrated, for example, in Table 1. As an example, Table 2 illustrates various densities determined by controller 220 and the possible actions that may be taken.

TABLE 2

| Density (pounds per cubic yard) | Weight Percent Estimate (of non-fiber items) | Action |
| --- | --- | --- |
| 310 | 25%-50% | No action, or inform tip floor operator 230 to place relatively more non-fiber items on system 106. |
| 360 | Negligible-25% | Inform tip floor operator 230 to place relatively more non-fiber items on system 106. |
| 250 | 50%-75% | No action, or inform tip floor operator 230 to place relatively more fiber items on system 106. |
| 180 | 75%-100% | Inform tip floor operator 230 to place relatively more fiber items on system 106. |

Similarly, when it is determined that recyclable items 202 include between, for example, approximately 50% to 75% non-fiber items, container transfer conveyor 116b and/or glass sorting and conveying system 120 can be adjusted to first and second speeds that are respectively faster than the relatively slow speeds to provide for increased throughput, preferably without affecting (or substantially affecting) the quality of sorted non-fiber items. In this case, because the recyclable items include between approximately 25% to 50% fiber items, conveying system 106 and/or fiber transfer conveyor 116a may be adjusted to fifth and sixth speeds that are respectively slower than the relatively fast speeds, so that workers or machinery that sort the fiber items have sufficient time to process the stream of fiber items.

If recyclable items 202 include, for example, between approximately 25% to 50% non-fiber items, container transfer conveyor 116b and/or glass sorting and conveying system 120 can be adjusted to speeds that are respectively faster than the first and second speeds for increased throughput, preferably without affecting (or substantially affecting) the quality of sorted non-fiber items. In this case, because the recyclable items include between approximately 50% to 75% fiber items, conveying system 106 and/or fiber transfer conveyor 116a may be adjusted to speeds that are respectively slower than the fifth and sixth speeds to ensure a desired quality of fiber item bales produced.

In some embodiments, controller 220 can be configured to adjust various components of system 100 (e.g., infeed conveying system 106, fiber transfer conveyor 116a, container transfer conveyor 116b, and/or glass sorting and conveying system 120) to be sufficiently fast so that no substantial backlog occurs. To this end, controller 220 can calculate and/or store minimum threshold speeds for each of the components (e.g., systems 106, 120 and conveyors 116a, 116b), based on estimated quantities of recyclable items that need to be transported and processed by each of the components within a predetermined period of time. Under the condition that the speeds for these components will not be adjusted below the respective minimum threshold speeds, controller 220 can further adjust their speeds to optimize or improve throughput in system 100 and to provide desired quality of bales or other products produced by the sorting operations, as illustrated, for example, in FIG. 4. As described above, controller 220 can also send information (e.g., material levels in surge hoppers 140a-e, and estimated quantities of recyclable items 202 that need to be processed by various components of system 100) to tip floor operator 230 so that adjustments in new material placed on the infeed conveying system 106 can be made.

For example, as discussed earlier in connection with FIG. 4, if it is determined that approximately 75% to 100% of recyclable items 202 are non-fiber items, it would be preferable for controller 220 to adjust container transfer conveyor 116b and/or glass sorting and conveying system 120 to relatively slow speeds to ensure a desired quality of sorted non-fiber items. However, to ensure that the non-fiber items can be transported and processed by conveyor 116b and system 120 within a predetermined period of time so that no substantial backlog occurs, controller 220 can calculate minimum threshold speeds for conveyor 116b and system 120. Controller 220 can then adjust conveyor 116b and system 120 to enhance quality, under the constraint that speeds of conveyor 116b and system 120 cannot respectively drop below the calculated minimum threshold speeds. Therefore, in this case, controller 220 maximizes or improves the quality of recyclable materials produced (or separated) by system 100 from recyclable items 202 after making sure that no substantial backlog will occur. As used herein, quality refers to the amount of impurities within a quantity and/or type of recyclable material. Generally, less impurity for a given weight or volume of produced (or separated) recyclable material corresponds to a higher quality.

Similarly, if it is determined that approximately 75% to 100% of recyclable items 202 are fiber items, it would be preferable for controller 220 to adjust infeed conveying system 106 and/or fiber transfer conveyor 116a to relatively slow speeds to ensure a desired quality of sorted fiber items. However, to ensure that fiber items can be transported and processed by system 106 and conveyor 116a within a predetermined period of time so that no substantial backlog occurs, controller 220 can calculate minimum threshold speeds for system 106 and conveyor 116a. Controller 220 can then adjust system 106 and/or conveyor 116a to enhance quality, under the constraint that speeds of system 106 and conveyor 116a cannot respectively drop below the calculated minimum threshold speeds.

Figure 5:
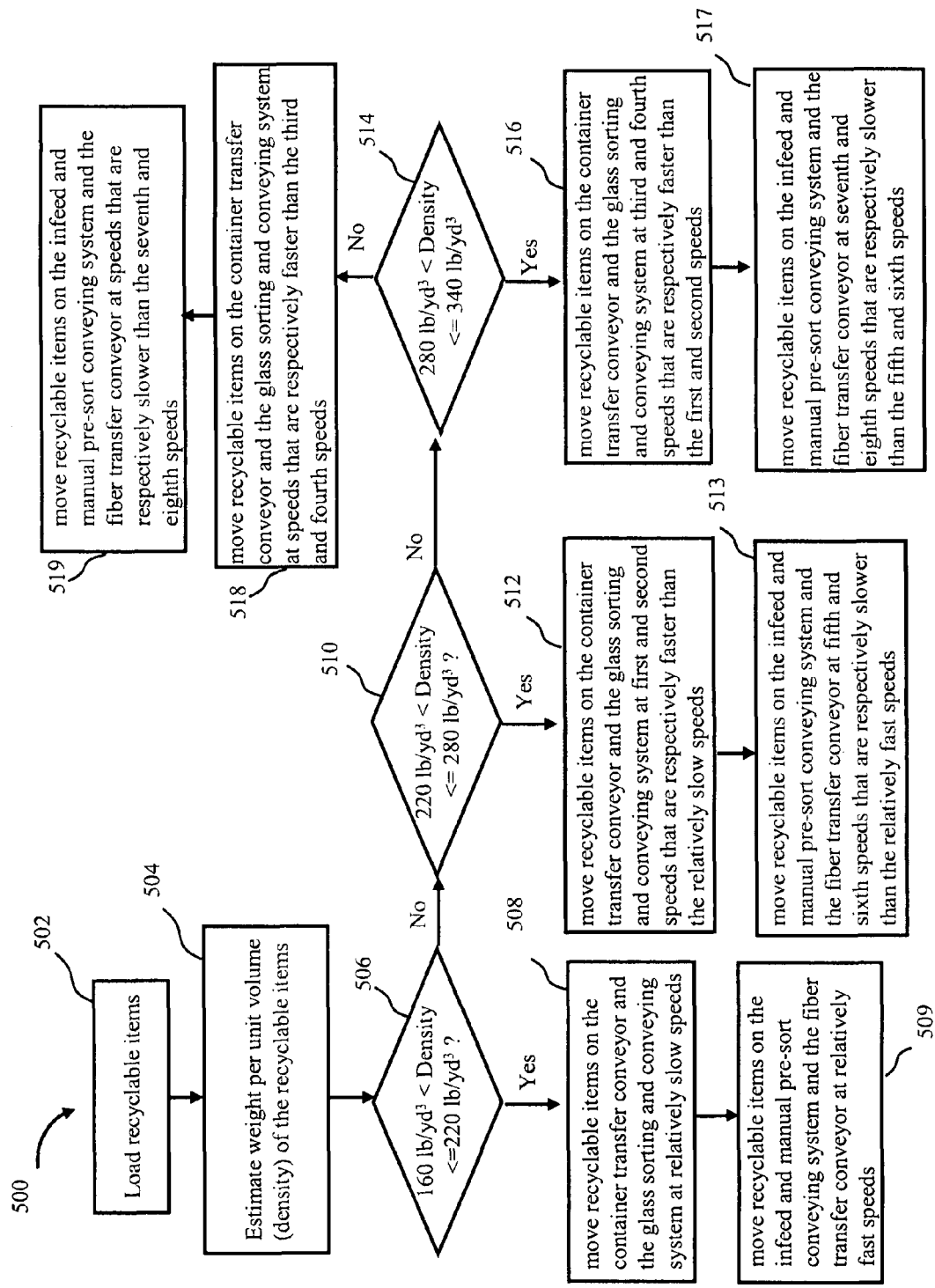
FIG. 5 is an exemplary flow chart illustrating a method in accordance with various embodiments of the present invention.

FIG. 5 is an exemplary flow chart illustrating a method 500 of various embodiments of the present invention that can be used to sort recyclable items in connection with system 100. At step 502, recyclable items 202 can be loaded onto infeed conveying system 106. At step 504, weight per unit volume (density) of recyclable items 202 can be estimated. The estimated weight per unit volume can be sent to tip floor operator 230 so that operator 230 may adjust the composition of new material placed on system 106.

At decision step 506, it is determined whether the estimated density of recyclable items 202 is between approximately 160 and 220 pounds per cubic yard. If so, at step 508, container transfer conveyor 116b and glass sorting and conveying system 120 of system 100 can be adjusted to relatively slow speed and, at step 509, infeed conveying system 106 and/or fiber transfer conveyor 116a can be adjusted to relatively fast speeds.

If, at decision step 510, it is determined that the estimated density of recyclable items 202 is between approximately 220 and 280 pounds per cubic yard, then, container transfer conveyor 116b and glass sorting and conveying system 120 of system 100 can be adjusted to transport recyclable items 202 at first and second speeds that are respectively faster than the relatively slow speeds at step 508. At step 513, infeed conveying system 106 and fiber transfer conveyor 116a can be adjusted to transport recyclable items 202 at fifth and sixth speeds that are respectively slower than the relatively fast speeds of step 509.

At decision step 514, if it is determined that the estimated density of recyclable items 202 is between approximately 280 and 340 pounds per cubic yard, then, at step 516, container transfer conveyor 116b and glass sorting and conveying system 120 of system 100 can be, adjusted to transport recyclable items 202 at third and fourth speeds that are respectively faster than the first and second speeds of step 512. At step 517, infeed conveying system 106 and fiber transfer conveyor 116a can be adjusted to transport recyclable items 202 at seventh and eighth speeds that are respectively slower than the fifth and sixth speeds of step 513.

If, at decision step 514, it is determined that the estimated density of recyclable items 202 is greater than approximately 340 pounds per cubic yard, then at step 518, container transfer conveyor 116b and glass sorting and conveying system 120 of system 100 can be adjusted to transport recyclable items 202 at speeds that are respectively faster than the third and fourth speeds of step 516. At step 519, infeed conveying system 106 and fiber transfer conveyor 116a can be adjusted to transport recyclable items 202 at speeds that are respectively slower than the seventh and eighth speeds of step 517. As discussed above, in some embodiments, infeed conveying system 106, fiber transfer conveyor 116a, container transfer conveyor 116b, and/or glass sorting and conveying system 120 can be adjusted to be sufficiently fast (i.e., above certain calculated minimum threshold speeds) so that no substantial backlog occurs.

Figure 6:
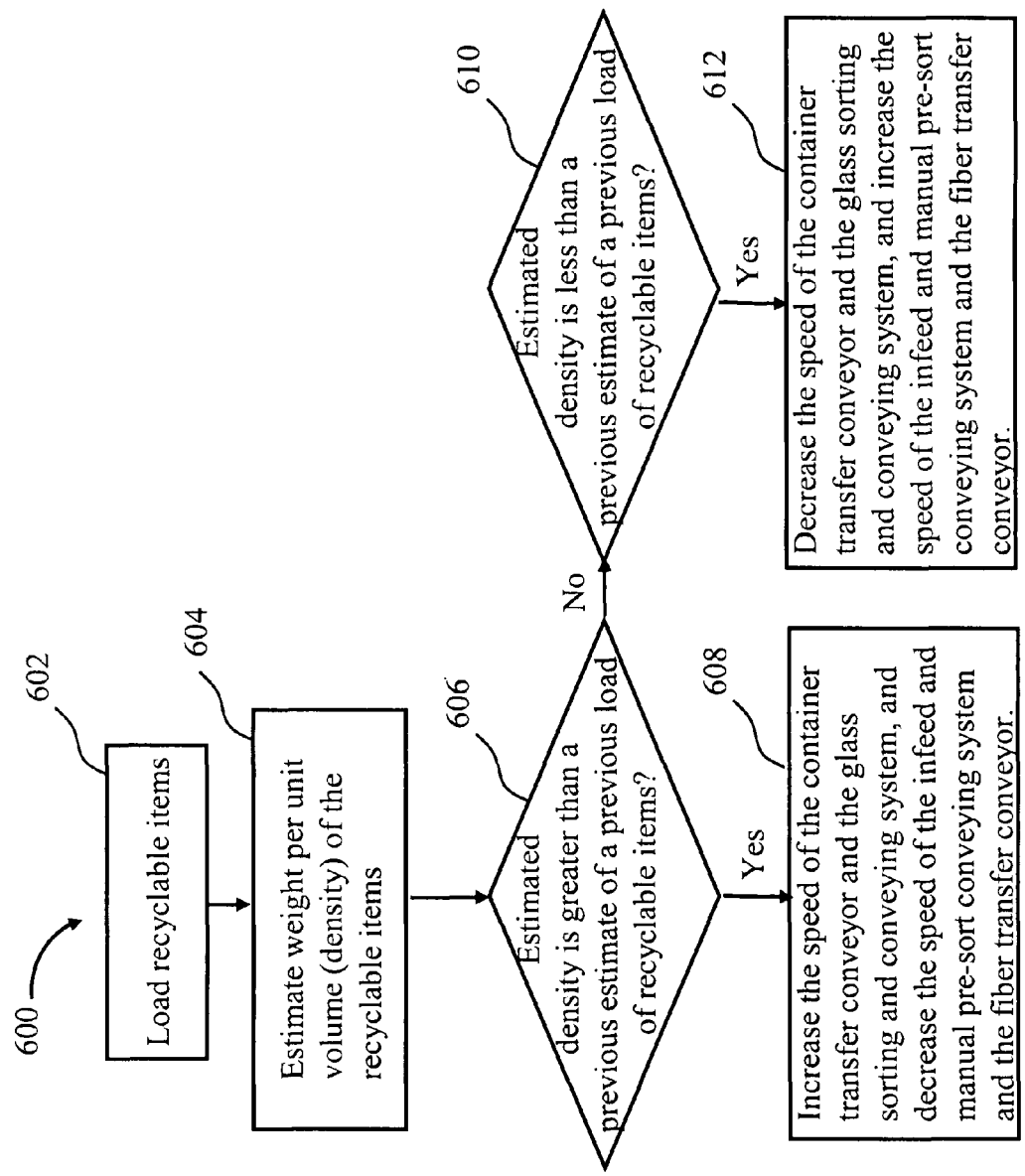
FIG. 6 is an exemplary flow chart illustrating a method in accordance with various embodiments of the present invention.

FIG. 6 is an exemplary flow chart illustrating a generalized method 600 in accordance with the present invention. At step 602, recyclable items 202 can be loaded onto infeed conveying system 106. At step 604, weight per unit volume (density) of recyclable items 202 can be estimated, for example, by measuring the weight and volume of recyclable items 202, as described in connection with FIG. 3. The estimated weight per unit volume can be sent to tip floor operator 230 so that operator 230 may adjust the composition of new material placed on system 106. If, at decision step 606, it is determined that the estimated density of recyclable items 202 is greater than a previous density estimate of a previous load of recyclable items, then, at step 608, the speed of container transfer conveyor 116b and/or the speed of glass sorting and conveying system 120 of system 100 can be increased. This is so because there are less non-fiber items in the present load than in the previous load. The speed of infeed conveying system 106 and/or the speed of fiber transfer conveyor 116a can be correspondingly decreased, because there are more fiber items in the present load than in the previous load.

At step 610, it is determined whether the estimated density of recyclable items 202 is less than a previous density estimate of a previous quantity of recyclable items 202. If so, at step 612, the speed of container transfer conveyor 116b and/or the speed of glass sorting and conveying system 120 of system 100 can be decreased, because there are non-fiber items more non-fiber items in the present load of recyclable items 202 than in the previous load. The speed of infeed conveying system 106 and/or the speed of fiber transfer conveyor 116a can be increased, because there are less fiber items in the present load than in the previous load.

In methods 500 and 600 described in FIGS. 5 and 6, the speed of infeed conveying system 106, the speed of fiber transfer conveyor 116a, the speed of container transfer conveyor 116b, and/or the speed of glass sorting and conveying system 120 can be adjusted to be adequate to process the loads of recyclable items received by system 100.

Other embodiments, extensions, and modifications of the ideas presented above are comprehended and within the reach of one skilled in the art upon reviewing the present disclosure. Accordingly, the scope of the present invention in its various aspects should not be limited by the examples and embodiments presented above. The individual aspects of the present invention, and the entirety of the invention should be regarded so as to allow for modifications and future developments within the scope of the present disclosure. The present invention is limited only by the claims that follow.

The invention claimed is:

1. A system for sorting a plurality of recyclable items, comprising:
an infeed conveying system configured to receive and transport the plurality of recyclable items;
at least one screen configured to receive the plurality of recyclable items from the infeed conveying system and remove at least a portion of fiber items from the plurality of recyclable items;
a fiber transfer conveyor configured to receive items from the at least one screen and facilitate removal of remaining fiber items;
a container transfer conveyor configured to receive and move non-fiber items from the at least one screen;
a ferrous sorting and conveying system configured to receive the non-fiber items from the container transfer conveyor and remove ferrous container items from the non-fiber items;
a glass sorting and conveying system configured to receive non-ferrous items from the ferrous sorting and conveying system and remove glass container items from the non-ferrous items;
at least one plastic sorting and conveying system configured to receive non-glass items from the glass sorting and conveying system and remove plastic items from the non-glass items;
at least one surge hopper configured to temporarily store recyclable items from at least one of: i) the fiber transfer conveyor, ii) the container transfer conveyor, and iii) the glass sorting and conveying system;
a detector for measuring an average depth of the plurality of recyclable items on the infeed conveying system;
a scale for measuring the total weight of the plurality of recyclable items on the infeed conveying system; and
a controller configured to (a) estimate a weight per unit volume for the plurality of recyclable items being transported on the infeed conveying system, (b) use the estimated weight per unit volume to estimate a percent weight of fiber items and a percent weight of non-fiber items, and (c) adjust, based on the estimated percent weights of fiber and non-fiber items, at least one of: i) a speed of the infeed conveying system, ii) a speed of the fiber transfer conveyor, iii) a speed of the container transfer conveyor, and iv) a speed of the glass sorting and conveying system,
the controller being configured to prevent the speed of the at least one of the infeed conveying system, the fiber transfer conveyor, the container transfer conveyor, or the glass sorting and conveying system from being adjusted to a speed slower than a minimum threshold speed, the minimum threshold speed being required to substantially finish transporting and processing the plurality of recyclable items within a predetermined period of time.

2. The system according to claim 1, wherein the controller decreases the speed of the infeed conveying system and the speed of the fiber transfer conveyor when the estimated percent weight of fiber items exceeds a predetermined threshold.

3. The system according to claim 2, wherein the controller increases the speed of the container transfer conveyor and the speed of the glass sorting and conveying system when the estimated percent weight of fiber items exceeds the predetermined threshold.

4. The system according to claim 1, wherein the controller increases the speed of the infeed conveying system and the speed of the fiber transfer conveyor when the estimated percent weight of non-fiber items exceeds a predetermined threshold.

5. The system according to claim 4, wherein the controller decreases the speed of the container transfer conveyor and the speed of the glass sorting and conveying system when the estimated percent weight of non-fiber items exceeds the predetermined threshold.

6. The system according to claim 1, wherein the infeed conveying system comprises i) a substantially horizontal infeed conveyor, ii) an angled and upfeed conveyor that receives input from the substantially horizontal infeed conveyor, and iii) a substantially horizontal manual pre-sort conveyor that receives an input from the angled and upfeed conveyor, and facilitates manual sorting of the plurality of recyclable items.

7. The system according to claim 1, wherein the controller decreases the speed of the infeed conveying system and the speed of the fiber transfer conveyor when the estimated percent weight of fiber items increases from a previous estimate.

8. The system according to claim 7, wherein the controller increases the speed of the container transfer conveyor and the speed of the glass sorting and conveying system when the estimated percent weight of fiber items increases from a previous estimate.

9. The system according to claim 1, wherein the controller decreases the speed of the container transfer conveyor and the speed of the glass sorting and conveying system when the estimated percent weight of non-fiber items increases from a previous estimate.

10. The system according to claim 9, wherein the controller increases the speed of the infeed conveying system and the speed of the fiber transfer conveyor when the estimated percent weight of non-fiber items increases from a previous estimate.

11. The system according to claim 1, further comprising at least one second measuring device configured to measure at least one material level of the at least one surge hopper and send the measured at least one material level to the controller.

12. The system according to claim 11, wherein the controller is configured to control, based on the measured at least one material level, at least one of: i) a speed of the infeed conveying system, ii) a speed of the fiber transfer conveyor, iii) a speed of the container transfer conveyor, and iv) a speed of the glass sorting and conveying system.

13. The system according to claim 1, further comprising a non-ferrous metal sorting and conveying system configured to receive an output from the at least one plastic sorting and conveying system and remove non-ferrous metal container items.

14. A system for sorting a plurality of recyclable, comprising:
   a fiber transfer conveyor configured to receive recyclable items comprising fiber items from at least one screen and facilitate manual removal of the fiber items;
   a ferrous sorting and conveying system configured to receive non-fiber items from the at least one screen and remove ferrous container items from the non-fiber items;
   a glass sorting and conveying system configured to receive non-ferrous items from the ferrous sorting and conveying system and remove glass container items from the nonferrous items;
   a detector for measuring an average depth of the plurality of recyclable items;
   a scale for measuring the total weight of the plurality of recyclable items; and
   a controller configured to (a) estimate, prior to the at least one screen receiving the recyclable items, a weight per unit volume for the plurality of recyclable items, (b) use the estimated weight per unit volume to estimate a percent weight of fiber items and a percent weight of non-fiber items, and (c) adjust, based on the estimated percent weights of fiber and non-fiber items, at least one of: i) a speed of the fiber transfer conveyor, or ii) a speed of the glass sorting and conveying system,
   the controller being configured to prevent the speed of the at least one of the fiber transfer conveyor and the glass sorting and conveying system from being adjusted to a speed slower than a minimum threshold speed, the minimum threshold speed being required to substantially finish transporting and processing the plurality of recyclable items within a predetermined period of time.

15. The system of claim 14, further comprising a container transfer conveyor configured to receive and transport non-fiber items from the at least one screen to the ferrous sorting and conveying system.

16. The system according to claim 15, wherein the controller is further configured to control, based on the estimate, a speed of the container transfer conveyor.

17. The system according to claim 14, wherein the controller estimates a percent weight of fiber items and a percent weight of non-fiber items by using at least a first weight, a second weight, a first volume, and a second volume.

18. The system according to claim 17, wherein the first weight and the first volume are measured at substantially the same time.

19. A system for controlling the processing of a plurality of recyclable items through a machine including a fiber transfer conveyer that conveys fiber in the machine, a container transfer conveyor that conveys containers in the machine and a glass transfer conveyor that transfers glass in the machine, the system comprising:
   an infeed conveying system configured to receive and transport the plurality of recyclable items including fiber, containers and glass items;
   a detector for measuring an average depth of the plurality of recyclable items on the infeed conveying system;
   a scale for measuring the total weight of the plurality of recyclable items on the infeed conveying system; and
   a controller configured to (a) estimate a weight per unit volume for the plurality of recyclable items being transported on the infeed conveying system, (b) use the estimated weight per unit volume to estimate the composition of the recyclable items, (c) send information to an operator, and (d) adjust, based on the estimated composition, at least one of: i) a speed of the infeed conveying system, ii) a speed of the fiber transfer conveyor, iii) a speed of the container transfer conveyor, and iv) a speed of the glass sorting and conveying system,
   the controller being configured to prevent the speed of the at least one of the infeed conveying system, the fiber transfer conveyor, the container transfer conveyor, or the glass sorting and conveying system from being adjusted to a speed slower than a minimum threshold speed, the minimum threshold speed being required to substantially finish transporting and processing the plurality of recyclable items within a predetermined period of time.

20. The system of claim 19 wherein the controller is configured to estimate the composition by estimating a percent weight of fiber items and a percent weight of non-fiber items.

21. The system according to claim 20, wherein the controller decreases the speed of the infeed conveying system and the speed of the fiber transfer conveyor when the estimated percent weight of fiber items exceeds a predetermined threshold.

22. The system according to claim 20, wherein the controller increases the speed of the container transfer conveyor and the speed of the glass sorting and conveying system when the estimated percent weight of fiber items exceeds the predetermined threshold.

23. The system according to claim 20, wherein the controller increases the speed of the infeed conveying system and the speed of the fiber transfer conveyor when the estimated percent weight of non-fiber items exceeds a predetermined threshold.

24. The system according to claim 20, wherein the controller decreases the speed of the container transfer conveyor and the speed of the glass sorting and conveying system when the estimated percent weight of non-fiber items exceeds the predetermined threshold.

25. The system according to claim 19, wherein the controller is configured to estimate a weight per unit volume for the plurality of recyclable items.

26. The system according to claim 25, further comprising a scale for measuring the total weight of the plurality of recyclable items on the infeed conveying system.

\* \* \* \* \*